E. STRONG AND H. TARBUTTON.
EMERGENCY AXLE.
APPLICATION FILED AUG. 6, 1921.
1,411,981.
Patented Apr. 4, 1922.
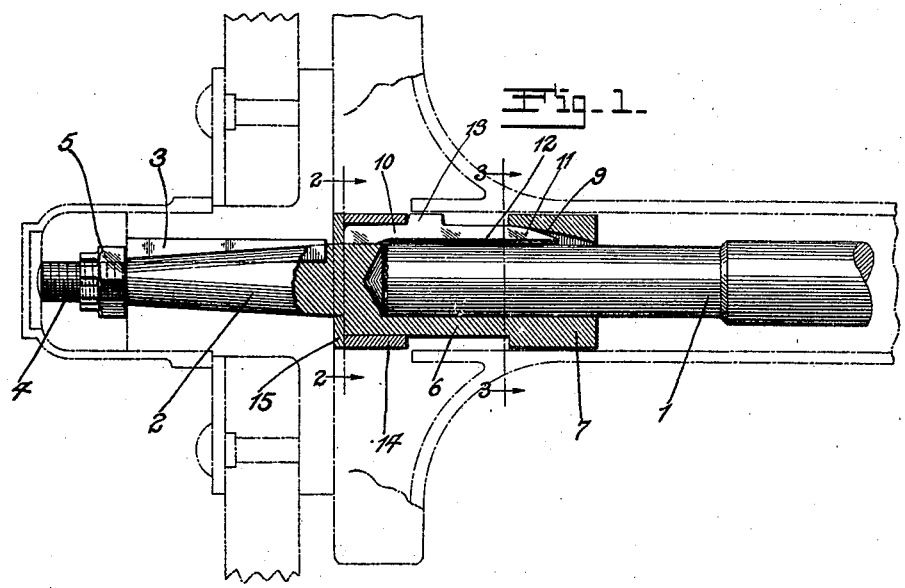
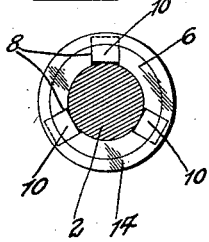
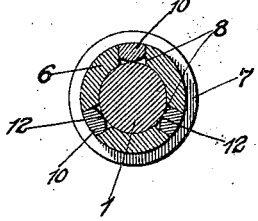
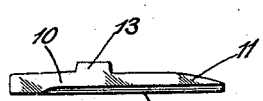
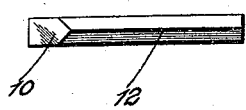
Inventors.
Elmer Strong,
Homer Tarbutton,
by Rippey Kingsland,
Their Attorneys.

UNITED STATES PATENT OFFICE.

ELMER STRONG AND HOMER TARBUTTON, OF MANSFIELD, MISSOURI, ASSIGNORS OF ONE-FOURTH TO FRANK L. BEACH AND ONE-FOURTH TO J. C. CARTER, BOTH OF MANSFIELD, MISSOURI.

EMERGENCY AXLE.

1,411,981.      Specification of Letters Patent.     Patented Apr. 4, 1922.

Application filed August 6, 1921. Serial No. 490,234.

*To all whom it may concern:*

Be it known that we, ELMER STRONG and HOMER TARBUTTON, citizens of the United States, residing at Mansfield, Wright County, Missouri, have invented a new and useful Emergency Axle, of which the following is a specification.

This invention relates to emergency axles.

An object of the invention is to provide a device adapted to be used as an emergency axle for attachment of the wheel to a broken axle of an automobile or the like.

Another object of the invention is to provide a device of the character and for the purpose mentioned, having novel and improved means for connection with the end of a broken axle.

Other objects will appear from the following description, reference being made to the accompanying drawing, in which—

Fig. 1 is a view with a part in section showing a device attached to a broken axle.

Fig. 2 is a cross-sectional view on the line 2—2 of Fig. 1.

Fig. 3 is a cross-sectional view on the line 3—3 of Fig. 1.

Fig. 4 is a side elevation of one of the keys by which the device is locked or clutched on the broken axle.

Fig. 5 is an inner side view of the key.

As shown in Fig. 1, the usual axle 1 has been broken off at or near a point at which the outer ends of the roller bearing elements operate. It is usually at this point that the axle breaks, especially in Ford automobiles, due to the fact that the axle becomes crystallized or otherwise damaged.

Our present invention comprises a device adapted to be attached to the broken end of the axle, and embodying means for connection with the usual wheel of the automobile whereby the automobile may be operated in the usual way without the necessity of being towed.

As shown, our device comprises a member including a shank 2 extending into the hub of a wheel of the automobile and keyed to the wheel by a key 3. The outer extremity 4 of the shank 2 is threaded to receive a nut 5 by which the wheel is held in place.

From the inner end of the shank 2 a cylindrical part 6 extends. The part 6 is of larger diameter than the diameter of the inner end of the shank 2 and, at its inner end, is formed with a larger cylindrical part 7 adapted to fill the space within the axle housing, taking the place of the roller bearing which is removed when this device is applied to the axle.

The cylindrical part 6—7 is hollow so as to receive the end of the broken axle, as shown in Fig. 1. The cylindrical part 6 is formed with a number of longitudinal slots 8 extending inwardly from the outer end of said part 6, and continuing as grooves 9 on the inner side of the part 7. As shown there are three of the slots 8 although the number may be varied, as desired.

The keys by which the emergency axle is locked or clutched in connection with the end of the broken axle of the automobile are placed within the slots 8, and engaged in the grooves 9 in the large cylindrical part 7. As shown each key includes an elongated body 10, having a beveled inner end 11 adapted to extend into the groove 9 extending from the slot 8 in which the key is placed. The inner side of each key is provided with a wedge point 12 for better engagement with the broken axle. A shoulder 13 is formed on the outer side of each key. A ring 14 is placed around the outer ends of the keys 10, the inner end of the ring engaging the outer edges of the shoulders 13. The ring 14 is engaged by the washer 15 so that when the wheel is placed on the shank 2 and the nut 5 is turned, the wheel will be forced inwardly onto the shank, thereby forcing the ring 14 inwardly and causing the ring to force the keys 10 inwardly a sufficient distance to lock or clutch the emergency axle device in connection with the broken axle. The edges 12 of the keys engage in rough stops or irregularities on the periphery of the broken axle and thus clamp the emergency axle rigidly in position.

In practice we have found that this device accomplishes all of its intended purposes. The emergency axle may be easily connected to the broken axle of the automobile and, as an incident to the forcing of the wheel on the emergency axle, the locking and clutching devices are adjusted to effect rigid engagement with the broken axle. It is then impossible for the emergency axle to turn relative to the broken axle.

It is apparent that variations may be made in the construction and arrangement of the device without departure from the nature and principle thereof.

We do not restrict ourselves to unessential features but what we claim and desire to secure by Letters Patent is:—

1. An emergency axle, comprising a shank adapted to fit within the hub of a wheel, a key arranged to interlock with said shank and with a hub of a wheel on said shaft, a hollow cylindrical part extending from the inner end of the shank adapted to receive the end of a broken axle and having longitudinal slots therein, an enlarged cylindrical portion rigid with the inner end of said cylindrical part having grooves in its inner side in continuation of said slots, and keys adapted to be located in said slots to form clutching engagement with the broken axle.

2. An emergency axle, comprising a shank adapted to fit within the hub of a wheel, a hollow cylindrical part extending from the inner end of the shank adapted to receive the end of a broken axle and having longitudinal slots therein, an enlarged cylindrical portion rigid with the inner end of said cylindrical part having grooves in its inner side in continuation of said slots, keys adapted to be located in said slots to form clutching engagement with the broken axle, and a device for clutching said keys in engagement with the broken axle.

3. An emergency axle, comprising a part adapted to be secured in the hub of a wheel, a key arranged to interlock with said part and with a hub of a wheel on said part, an integral cylindrical part adapted to receive the end of a broken axle and having longitudinal slots therein, clamp members adapted to be located in said slots to engage the broken axle, and a ring for binding the clamp members in engagement with the broken axle and arranged to be forced to binding position as an incident to the placing of a wheel on said part.

4. An emergency axle, comprising a part adapted to be secured in the hub of a wheel, a key arranged to interlock with said part and with a hub on a wheel on said part, an integral cylindrical part adapted to receive the end of a broken axle and having longitudinal slots therein, clamp members adapted to be located in said slots to engage the broken axle, a ring for binding the clamp members in engagement with the broken axle and arranged to be forced to binding position as an incident to the placing of a wheel on said part, and an enlarged part integral with the inner end of said cylindrical part adapted to operate against the inner surface of the axle housing.

5. In a device of the character described, a cylindrical part adapted to receive the end of a broken axle and having longitudinal slots, removable clutch members adapted to be located in said slots to engage the periphery of the broken axle, a ring integral with the inner end of said cylindrical part having grooves for receiving the ends of said clutch members, and a removable ring embracing the outer ends of said clutch members.

6. A device of the character described, comprising a hollow cylindrical part, having longitudinal slots therein, a ring integral with the inner end of the cylindrical part having grooves therein in continuation of said slots, a clutch member located in each groove and extending into the corresponding slot in the ring, a radially extending shoulder on each clutch member, and a ring removably encircling said cylindrical part and the outer ends of said clutch members and bearing against the outer edges of said shoulders.

7. A device of the character described, comprising a wheel supporting member, a cylindrical part integral with said member adapted to receive the end of a broken axle and having longitudinal slots therein, removable clutch members located in said slots, a ring integral with the inner end of said cylindrical part, holding the ends of said clutch members pressed against the axle, radial shoulders on said clutch members, and a removable ring encircling said removable part and the outer ends of said clutch members and bearing against said shoulders, holding said clutch members pressed against the axle.

8. A device of the character described, comprising a wheel supporting part, a hollow cylindrical part integral with the wheel supporting part and having longitudinal slots therein, a clutch member located in each of said slots, each of said clutch members having a wedge-shaped inner portion adapted to engage the periphery of an axle extending into said cylindrical part, and means for clamping said clutch members in engagement with the periphery of the axle.

ELMER STRONG.
HOMER TARBUTTON.